(12) United States Patent
Liebzeit

(10) Patent No.: US 7,866,503 B2
(45) Date of Patent: Jan. 11, 2011

(54) STEAM-TABLE PAN

(75) Inventor: Mark Liebzeit, Fond du Lac, WI (US)

(73) Assignee: Polar Ware Company, Kiel, WI (US)

( * ) Notice: Subject to any disclaimer, the term of this patent is extended or adjusted under 35 U.S.C. 154(b) by 115 days.

(21) Appl. No.: 12/042,805

(22) Filed: Mar. 5, 2008

(65) Prior Publication Data

US 2008/0185390 A1    Aug. 7, 2008

Related U.S. Application Data

(63) Continuation-in-part of application No. 11/760,572, filed on Jun. 8, 2007, now abandoned, which is a continuation of application No. 11/623,557, filed on Jan. 16, 2007, now abandoned.

(51) Int. Cl.
  *A47J 27/00* (2006.01)
  *A47J 36/00* (2006.01)
  *A47J 37/01* (2006.01)

(52) U.S. Cl. .................................. 220/573.1

(58) Field of Classification Search .............. 220/573.1, 220/573.4, 657
See application file for complete search history.

(56) References Cited

U.S. PATENT DOCUMENTS

| | | | |
|---|---|---|---|
| 2,602,568 A | 7/1952 | Kinney, Jr. | |
| 3,112,948 A | 12/1963 | Burns | |
| 3,179,287 A | 4/1965 | Rickmeier, Jr. | |
| 4,082,184 A | 4/1978 | Hammer | |
| 4,204,609 A | 5/1980 | Kuhn | |
| 4,700,842 A | 10/1987 | Grusin | |
| 4,804,092 A | 2/1989 | Jones | |
| 5,131,708 A | 7/1992 | Denzin | |
| 5,203,836 A | 4/1993 | Brazis et al. | |
| 5,322,178 A * | 6/1994 | Foos | 220/326 |
| 5,381,729 A | 1/1995 | Hennessy et al. | |
| 5,511,467 A | 4/1996 | Motley et al. | |
| 5,676,276 A | 10/1997 | Zielinski et al. | |
| 6,092,670 A | 7/2000 | Marriott | |
| 6,349,843 B1 | 2/2002 | Mittmann et al. | |
| 6,415,945 B1 | 7/2002 | Zank et al. | |
| 6,557,720 B2 | 5/2003 | Roberts et al. | |
| 6,568,534 B2 | 5/2003 | Zank | |
| 7,021,202 B2 | 4/2006 | Sizer | |
| 7,112,764 B2 | 9/2006 | Garcia | |
| 2005/0252814 A1 * | 11/2005 | Lobman et al. | 206/518 |
| 2006/0208511 A1 | 9/2006 | Romsburg et al. | |

OTHER PUBLICATIONS

Vollrath Catalog: Super Pan 2 Catalog Pages. Date: 2006-2007.
Vollrath Catalog: Super Pan 3 Catalog Pages. Date: 2006-2007.
Vollrath Catalog: One-Piece Oval Spoodle Catalog Pages. Date: 2006-2007.

* cited by examiner

*Primary Examiner*—Harry A Grosso
(74) *Attorney, Agent, or Firm*—Boyle Fredrickson, S.C.

(57) ABSTRACT

The invention is a steam-table pan formed of drawn metal sheet, the pan having a pinch-gripping bead including a gripping-skirt which is configured and vertically dimensioned for pinch-gripping of the bead with an adult's fingers to raise the pan from the steam table. The configuration of the steam-table pan provides substantially enhanced deformation resistance without a corresponding increase in thickness of the metal sheet.

15 Claims, 9 Drawing Sheets

STEAM-TABLE PAN

RELATED APPLICATION

This application is a continuation-in-part of currently pending patent application Ser. No. 11/760,572, filed on Jun. 8, 2007, which is a continuation of abandoned patent application Ser. No. 11/623,557, filed Jan. 16, 2007. The contents of both applications are incorporated herein by reference.

FIELD OF THE INVENTION

This invention relates to food pans, particularly to food pans for use in buffet and/or steam tables (referred to collectively herein as "steam tables").

BACKGROUND OF THE INVENTION

In the food service industry, foods are often served on buffet tables designed to maintain desired temperatures for cold or hot foods. The desired temperature maintenance is provided by cold air or hot steam (and/or cold or hot water) within the chamber of a steam table. Such chamber, of course, is immediately beneath the top wall of the steam table, and the top wall has openings to receive special food-serving pans such that the walls of the pan (sidewalls and bottom wall) are fully exposed to the chamber when the pan is in place on the steam table.

Steam-table pans have a lip-portion protruding outwardly from the upper edges of the sidewalls, and when the pan is in position on the steam table, it is supported by the engagement of its lip-portion with the top of the steam-table top wall. Thus, the food in the pan is kept at the desired temperature (or, more specifically, within a desired temperature range, by the fluid (air, steam and/or liquid water) in contact with the pan. Of course, it is important that the pan or pans on the steam table sufficiently close the chamber to prevent undesired heat losses or gains. The "seal" between the pan and the table top is provided by the contact of the lip-portion of the pan with the top of the steam table.

In use, steam-table pans need to be repeatedly removed from the steam table for refilling, replacement, cleaning and other reasons. Steam-table pan configurations have made it difficult to remove the pans from steam tables. Typically, lifting is accomplished by wedging a finger, utensil or other tool under the lip-portion to begin lifting the pan. Such actions may be rather dangerous to a person trying to lift the pan from the table since uncontrolled escape of steam may burn the person's hand. It is rather common practice for personnel to attempt to facilitate this initial lifting step by intentionally and permanently deforming the lip-portion in one or more places to provide a gripping place or to facilitate a wedging step. Such lip deformation breaks the "seal" between the pan and the table top, which results in harmful heat losses or gains. This can greatly decrease steam-table efficiency by raising the use of power for maintaining the desired temperature, not to mention the fact that the appearance of the pan is ruined. There is a need for a steam-table pan which is easily removable from the steam table and which, when the pan is in place, reliably closes the chamber to prevent energy inefficiency throughout the life of the pan.

These problems are so longstanding and commonplace that some inventive efforts have been made to deal with such problems. One of the existing solutions to the problem of raising a pan out of the steam table involves a "ramping" configuration which involves a rather drastic change in pan geometry which allows a pushing or pulling action on the inside surface of a pan sidewall against the edge of a steam-table opening to cause some initial raising of the pan, thereby to facilitate lifting and removal.

Such "ramping" pans, which are understandably quite expensive, have a number of disadvantages stemming from their unusual configurations.

Among the problems are a resulting loss in pail capacity because of the more-inward nature of the configuration due to the ramping features. Also, the ramping configuration is such that it may increase the possibility of spilling pan contents due to the less-vertical nature of the pan sidewalls near the lip-portion. Furthermore, the non-standard shapes of such "ramping" pans mean that they are not readily stacked with users' existing inventories of steam-table pans of typical configurations. A further disadvantage of such "ramping" pans is that because of their non-typical configurations they typically require that accessories used with steam-table pans, such as wire grates, false bottoms and even some utensils, cannot be of standard shapes and sizes. For example, wire grates and false bottoms may have to be smaller than standard wire grates and false bottoms; and serving scoops may require unusual, non-standard shapes because scoops of standard round-edge shapes will not completely engage with bottom and side corners of the pans. The requirement of special accessories tends to significantly increase the total cost to an institution of using such "ramping" pans.

Still another problem is that the pushing or pulling action on the inside surfaces of such "ramping" pans typically involves manual contact with wall surfaces which are or have been exposed to food. This may raise concerns related to sanitation, whether or not personnel use gloves, and also creates finger/glove cleanliness issues. Also related to cleanliness is the fact that such "ramping" pans, with their significantly increased surface irregularities, are more difficult to wash. Wiping action on inside surfaces must give additional attention to such irregularities in order to avoid food residues from remaining after washing operations.

Thus, there is a need for a steam-table pan which provides easy removability from the steam table without giving rise to aforementioned problems associated with pans having the aforementioned "ramping" features.

Another problem with certain steam-table pans of the prior art arises because such pans frequently moved around for different purposes in fast-moving institutional kitchen operations. Such movements and handling on many occasions can result in pans dropping and receiving significant impact damage on their lip-portions. In addition, in kitchen storage areas various heavy objects may fall on steam-table pans causing deformation of the lip-portions. Any such deformations tend to be permanent, and cause the same problems as the intentional lip-portion distortions mentioned above. Pan deformation obviously limits useful pan life, giving rise to replacement costs. Thus, it is highly desirable to have long-lasting, sturdy pan construction. There is a need in the industry for steam-table pans with improved edge-portion strength.

As is seen from the above reference to deformation caused by unintentional dropping or banging about of steam-table pans, deformation of pan edge portions is a significant problem in the field of steam-table pans. Steam-table pans, although typically formed of drawn metal sheet such as 22-gauge or even 20-gauge steel, have edge portions that are too easily deformed. There is a need in the steam-table industry for pans with much greater resistance to edge deformation.

In summary, there is a need for an improved steam-table pan which is easily liftable from steam tables and which overcomes all of the aforementioned problems.

OBJECTS OF THE INVENTION

It is an object of the invention to provide an improved steam-table pan overcoming some of the problems and shortcomings of the prior art, including those referred to above.

Another object of the invention is to provide a steam-table pan which is easily removable from the steam table simply by hand gripping and lifting.

Another object of the invention is to provide a steam-table pan with such easy removal characteristic and which, when the pan is in place, reliably closes the chamber to prevent energy inefficiency throughout the life of the pan.

Yet another object of the invention is to provide a steam-table pan with improved lip-portion strength for long-lasting, sturdy pan construction.

Another object of the invention is to provide a steam-table pan which is designed for easy removability from the steam table without sacrifice of pan capacity.

Another object of the invention is to provide a steam-table pan which is designed for easy removability from the steam table without increased possibility of spillage.

Yet another object of the invention is to provide a steam-table pan which is designed for easy removability, yet allows use of accessories of typical sizes.

Another object of the invention is to provide a steam-table pan which is easily removable from the steam table and can be readily stacked with users' existing inventories of pans.

Still another object of the invention is to provide a steam-table pan which is easily removable from the steam table and minimizes pan-washing problems.

How these and other objects are accomplished will become apparent from the following descriptions and the drawings.

SUMMARY OF THE INVENTION

This invention, which will be described in detail below, is an improvement in steam-table pans formed of drawn metal sheet of the type including (a) a surrounding wall that is dimensioned for insertion in an opening in the top of a steam table and has an upper edge and (b) a lip-portion integral with the upper edge and protruding outwardly therefrom to overlap the steam-table top.

The inventive steam-table pan has a pinch-gripping bead which includes the normal upper portion of the surrounding wall, the lip-portion, and a gripping-skirt, now described. The gripping-skirt is substantially vertical and integral with the lip-portion, extends downwardly from the lip-portion to rest on the steam-table top, and is configured and vertically dimensioned for pinch-gripping of the bead with an adult's fingers to raise the pan from the steam table. The fact that the gripping-skirt is configured and vertically dimensioned for pinch-gripping of the bead with an adult's fingers to raise the pan from the steam table means that it is such that an adult can pinch-grip the bead and lift the pan from its fully-engaged position on the steam table. The term "pinch-gripping" means firmly holding the inner surface of the upper portion of the surrounding wall and the gripping-skirt between his or her (1) thumb and (2) index and/or middle finger(s). Preferably, the gripping-skirt is vertically dimensioned for engagement of such gripping-skirt by a mid-portion of an adult's thumb to raise the pan from the steam table.

In highly preferred embodiments, the gripping-skirt is configured such that it extends vertically downwardly from the lip-portion by a distance greater than the horizontal dimension of the lip-portion between the upper edge of the pan wall and the gripping-skirt. The vertical dimension of the gripping-skirt is preferably at least about ½ inch.

It is further preferred that the gripping-skirt be substantially parallel to the surrounding wall. The term "substantially parallel" as used herein does not require a true parallel relationship between the gripping-skirt and upper portion of the surrounding wall. However, it is preferable that they at least partially extend in the same direction, resulting in substantially equidistant relationships of horizontally-spaced planar portions to facilitate a secure grip of the pinch-gripping bead between an adult's fingers for pan-lifting purposes.

An important aspect of the present invention is that the configuration of the pinch-gripping bead provides substantially enhanced deformation resistance in pan-edge portions without a corresponding increase in thickness of the metal sheet (decrease in the gauge of the sheet metal). The necessary substantial vertical dimension of the gripping-skirt serves as vertical reinforcement of edge region of the pan. In the prior art, pan-edge distortion, particularly in corner areas, whether due to intentional bending or unintentional dropping or impact, was not readily resisted by the nature of the pan-edge area. However, edge regions of the pan of this invention, including deformation-susceptible corner areas, have significantly greater resistance to distortion than is seen in any prior art steam-table pans of similar metal gauge.

The inventors and their associates commissioned impact/drop testing on the inventive steam-table pan. Two types of tests were performed, one involving load testing and the other involving impact/drop testing. The independent testing showed that corner portion of the edge areas of the pans of this invention are far stronger than for certain prior pans. Such improved strength does not come by virtue of thicker metal, but by virtue of the unique edge features of this invention.

In referring to drop-test results, comparisons are always made between full-size pans of similar metal gauge, or between half-size pans of similar metal gauge. (Full-size pans typically have a length of about 20.75 inches and a width of 12.75 inches, while half-size pans typically have the same width but a length of 10.375 inches, in each case regardless of pan depth. The term "pan size" as used herein refers to the width and length of a steam-table pan, which of course relates to its insertion into a steam table.)

This invention provides dramatic improvement in pan strength. In fact, in corner drop-tests, for half-size pans the configuration of the pinch-gripping bead surprisingly exhibits deformation resistance at least about twenty times greater than for old-style standard steam-table pans of similar gauge. And, for half-size pans the configuration of the pinch-gripping bead surprisingly exhibits deformation resistance which is about a full order of magnitude greater than is exhibited even for the old-style ramping-type steam-table pans (referred to above) of similar gauge. For full-size pans, which by industry standards have a lip-portion with horizontal dimension greater then that for half-size pans, the inventive configuration exhibits deformation resistance of at least about four times greater than for full-size old-style steam-table pans of similar gauge.

The advantage of dramatically improved strength provided by this invention can, of course, also mean that acceptable distortion resistance may be achieved even with some cost-saving reductions in material thickness.

Manufacturing of the steam-table pan with the pinch-gripping bead involves a variation from the normal production process, namely, the adding of an extra metal drawing step to achieve a vertical dimension of the bead that permits pinch-gripping of the bead with an adult's fingers to raise the pan from the steam table.

The steam-table pan also includes a bottom-wall, bottom corners that are integral with the surrounding wall and the bottom-wall, such bottom-corners being shaped with common partial circular cross-sections. The surrounding wall includes the sidewalls and also side-corners which are integral with adjacent pairs of sidewalls, the side-corners being shaped with the common partial circular cross-sections just mentioned. Such common partial circular cross-sections facilitates full engagement of all corners by industry-standard circular-edged utensils.

The term "industry-standard circular-edged utensils" means utensils (e.g., serving spoons, loons, scoops or dishers) having scooping radii of commonly used existing utensils. For example, scooping radii for some common utensils of different capacities are 1.23 inches, 1.56 inches, 1.66 inches, 2.00 inches and 2.22 inches. The common partial circular cross-sections of the bottom-corners and side-corners are shaped to accommodate such utensils; no special utensils are needed for buyers/users of the inventive steam-table pans.

The term "old-style standard steam-table pan" refers to the well-known drawn-metal steam-table pans which each include (1) a surrounding wall dimensioned for insertion in an opening in the top of a steam table, (2) a wall upper edge, and (3) a lip-portion integral with the upper edge and protruding outwardly therefrom to overlap the steam-table top, and which have either no downwardly extending portion whatsoever at the distal edge of the lip-portion or, at most, a downwardly extending portion which is insufficient (in any configuration) for purposes of horizontal pinch-gripping of the upper portion of the pan—i.e., insufficient for firmly holding the inner surface of the upper portion of the surrounding wall and the downwardly extending portion between a person's thumb and index and/or middle finger(s). Two typical examples of old-style standard steam-table pans are illustrated in fragmentary schematic FIGS. 5 and 6, which are labeled "Prior Art." The prior art pans illustrated each have a pan depth of about two and a half inches, one of the industry standard depths.

The term "old-style ramping-type steam-table pan" refers to drawn-metal pans of the sort disclosed in U.S. Pat. No. 6,415,945, which each include a surrounding wall having a sloping upper edge portion, a lip-portion integral with the upper edge and protruding outwardly therefrom to overlap the steam-table top, and an outwardly sloping downward portion with a vertical dimension of about 0.1875 inch. Pinch-gripping of such upper edge portion is not possible. A typical old-style ramping type steam-table pan is illustrated in FIG. 7, which is like FIG. 21A of the '945 patent.

The steam-table pan of this invention overcomes the problems described above, and provides important advantages for institutional food operations.

DETAILED DESCRIPTION OF PREFERRED EMBODIMENTS

Figure 1:
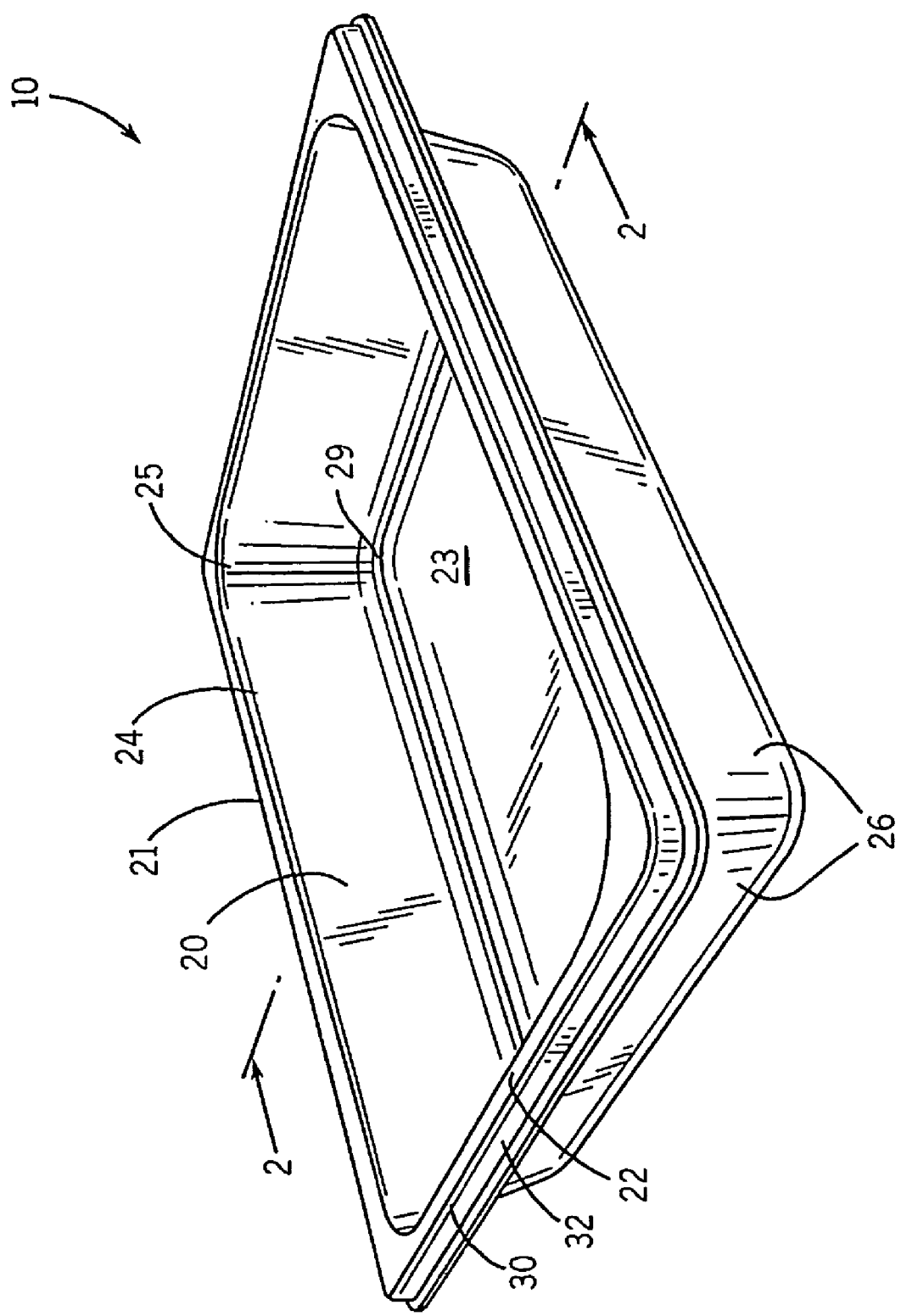
FIG. 1 is a perspective view of a steam-table pan approximately two and a half inch deep having a pinch-gripping bead of this invention.

The drawings show an improved steam-table pan 10 of the type including (a) a surrounding wall 20 that is dimensioned for insertion in an opening in the top 12 of a steam table and has an upper edge 21 and (b) a lip-portion 22 integral with upper edge 21 and protruding outwardly therefrom to overlap steam-table top 12.

Steam-table pan 10 has a pinch-gripping bead 30 which includes the normal upper portion 24 of surrounding wall 20, lip-portion 22, and a gripping-skirt 32. As seen in the figures, gripping-skirt 32 is integral with lip-portion 22, extends downwardly from lip-portion 22 to rest on steam-table top 12, and is configured and vertically dimensioned for pinch-gripping of bead 30 with an adult's fingers 14 to raise pan 10 from the steam table.

Figure 2:
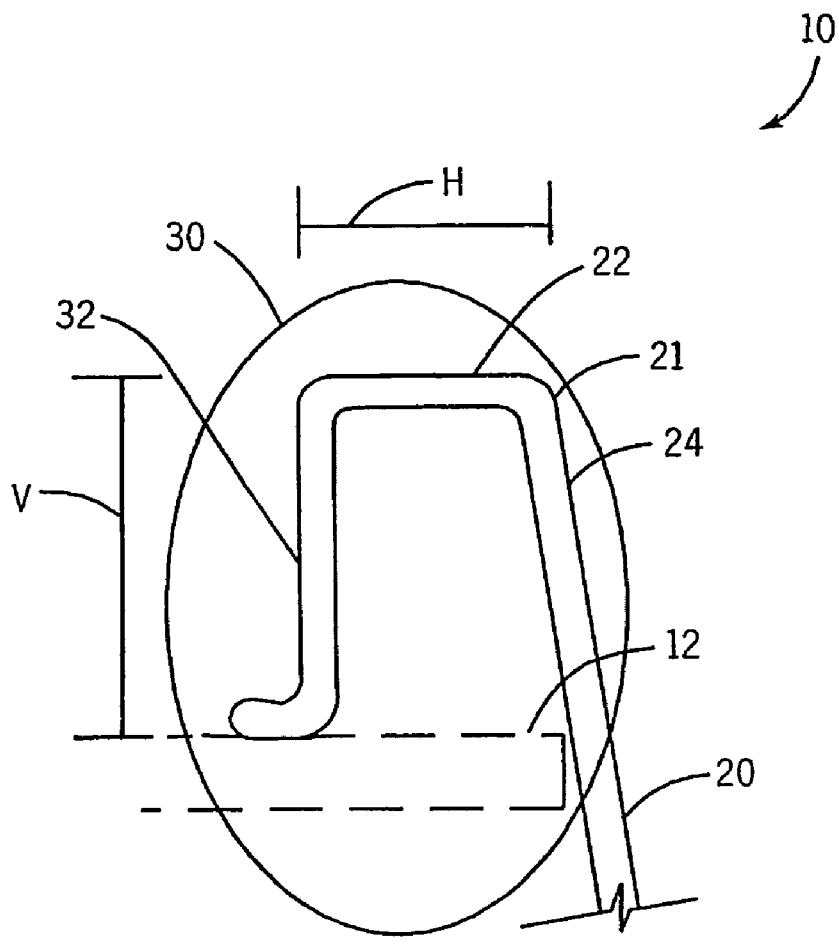
FIG. 2 is an enlarged fragmentary sectional view taken along section 2-2 as indicated in FIG. 1.
Figure 2:
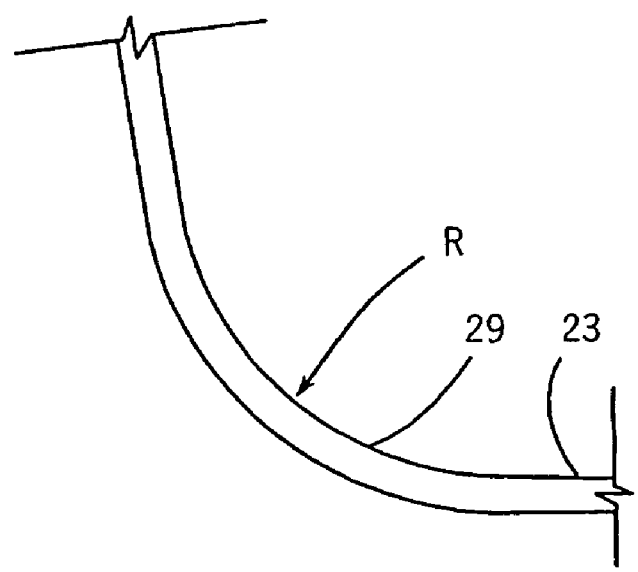
Figure 3:
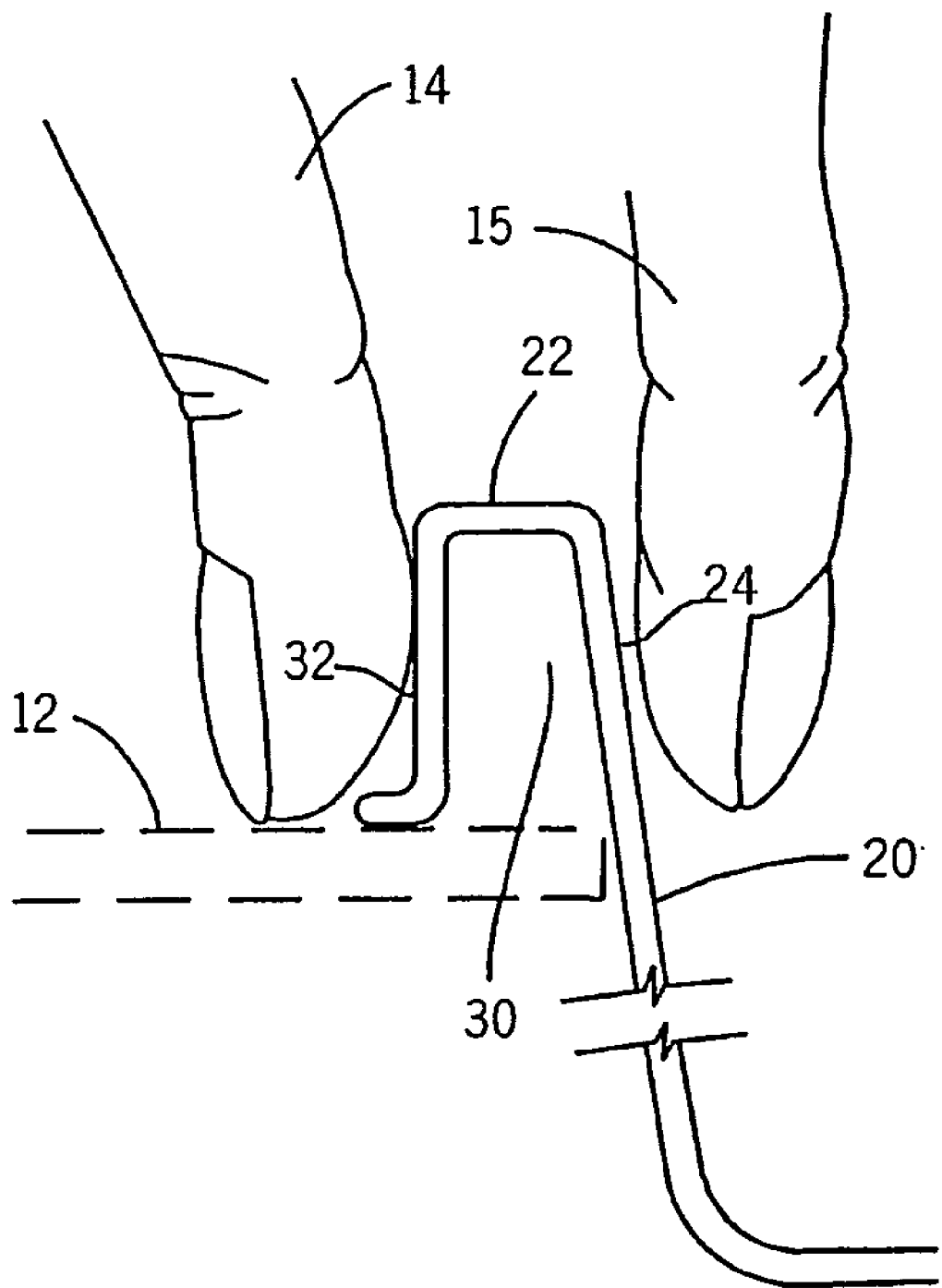
FIG. 3 is a sectional view like on FIG. 2 and showing pinch-gripping action by adult's fingers.

As best shown in FIG. 2, gripping-skirt 32 has a vertical dimension V which facilitates engagement therewith by the mid-portion of an adult's thumb 14 to raise the pan from the steam table. FIG. 3 illustrates adult's fingers 14 and 15 pinch-gripping the inner surface of upper portion 21 of surrounding wall 20 and gripping-skirt 32 between his/her thumb 14 and index finger 15. FIG. 2 best shows gripping-skirt 32 configured such that it extends vertically downwardly from lip-portion 22 by a distance V which is greater than a distance H on which lip-portion 22 extends horizontally outwardly from upper edge 21 of surrounding wall 20.

FIGS. 2 and 3 show gripping-skirt 32 being substantially parallel to surrounding wall 20. Gripping-skirt 32 is substantially vertical.

Steam-table pan 10 also includes a bottom-wall 23, bottom corners 29 that are integral with surrounding wall 20 and bottom-wall 23, such bottom-corners 29 being shaped with common partial circular cross-sections with a radius R, as shown in FIG. 2. Surrounding wall 20 includes sidewalls 26 and also side-corners 25 which are integral with adjacent pairs of sidewalls 26, side-corners 25 being shaped with the common partial circular cross-sections with radius R.

Figure 4:
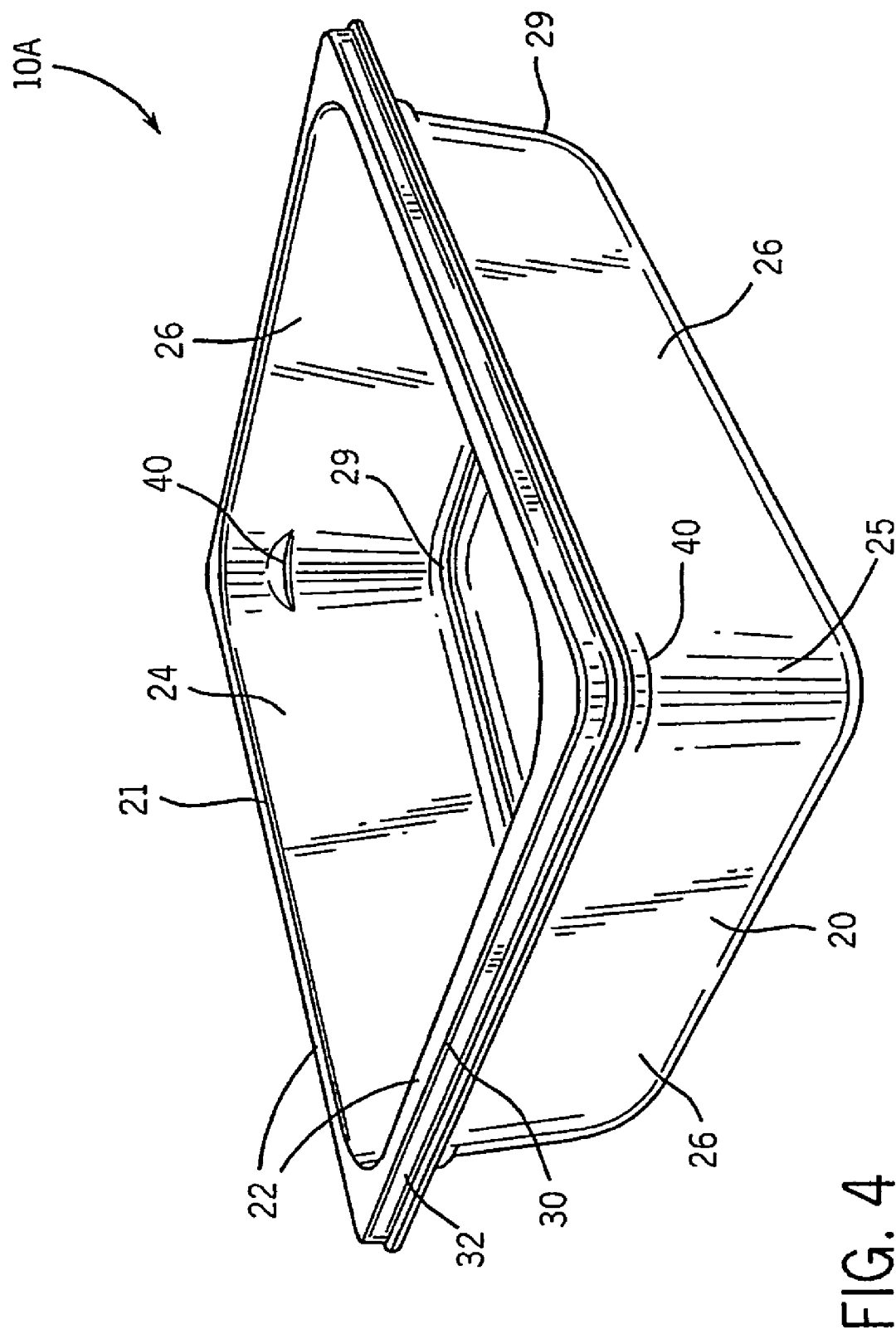
FIG. 4 is a perspective view of another embodiment of a steam-table pan approximately four inches deep that has a pinch-gripping bead in accordance with this invention.

In pan 10A, shown in FIG. 4, surrounding wall 20 includes a plurality of sidewalls 26 extending between corners 25 integral with adjacent sidewalls 26. Surrounding wall 20 further has anti-jam wall-portions 40 to prevent jamming of multiple pans 10A stacked together. As is also seen from FIG. 4, each anti-jam wall-portion 40 is off-planar with respect to its respective sidewall 26.

Figure 5:
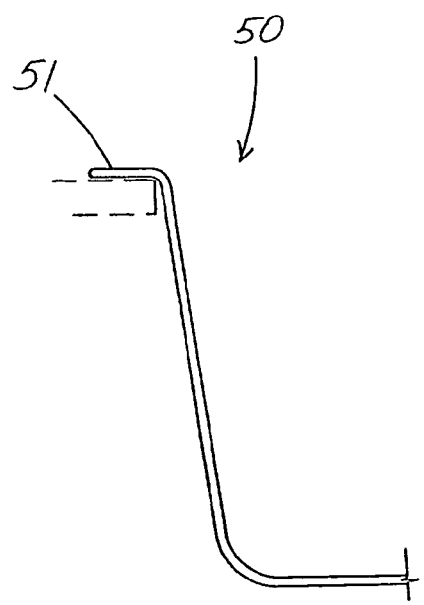
FIG. 5 is a fragmentary sectional view of one example of an old-style standard steam-table pan.
Figure 6:
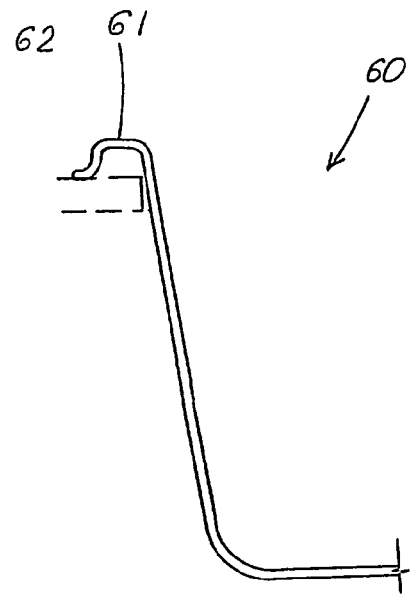
FIG. 6 is a fragmentary sectional view of another example of an old-style standard steam-table pan.

The old-style standard steam-table pan 50 shown to scale in FIG. 5 includes a lip-portion 51 overlapping the steam-table top 12. Pan 50 does not have any downwardly extending portion whatsoever at the distal edge of the lip-portion 51. The old-style standard steam-table pan 60 of FIG. 6 is similar to pan 50 except that pan 60 has a lip-portion 61 and a downwardly extending portion 62, which is insufficient for purposes of horizontal pinch-gripping.

Figure 7:
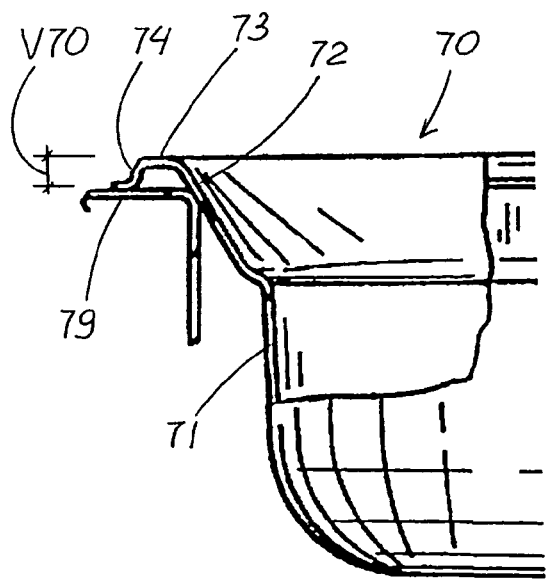
FIG. 7 is a fragmentary sectional view of an example of an old-style ramping-type steam-table pan.
Figure 8:
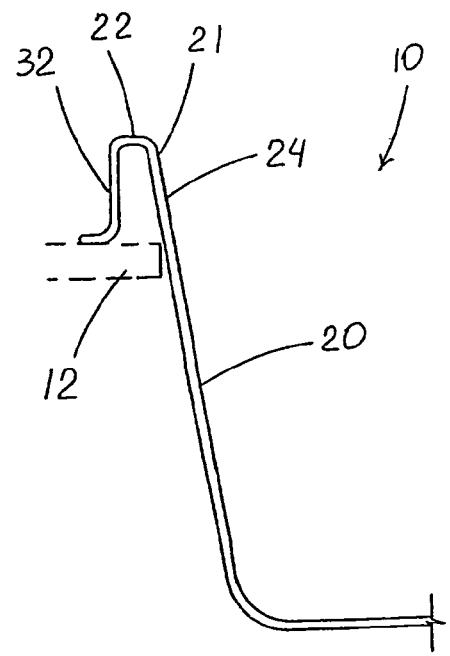
FIG. 8 is a fragmentary sectional view of an embodiment of the inventive pan which, like the old-style steam-table pans of FIG. 5-7, has a depth of two and a half inches and is shown to scale, as are FIGS. 5-7.
Figure 9:
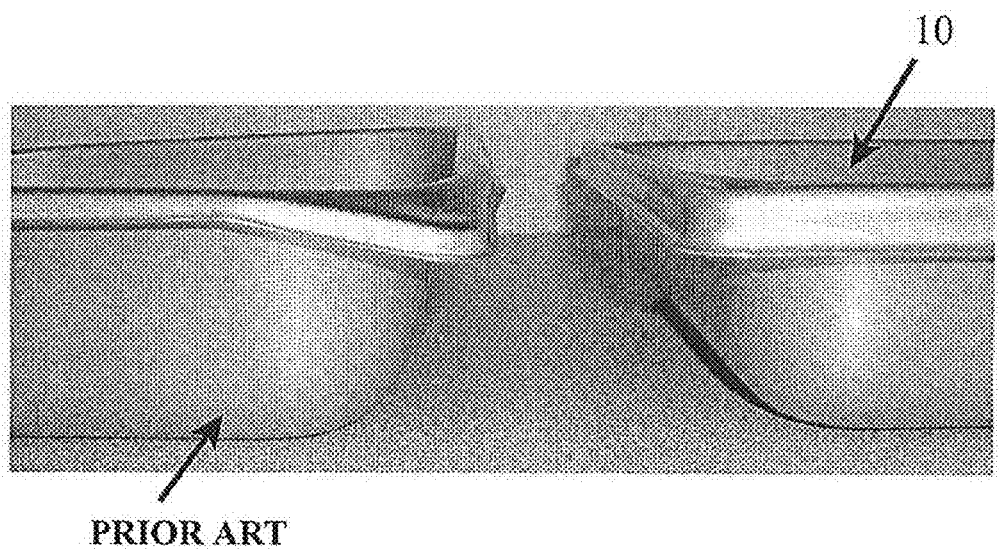
FIG. 9 is a side-by-side photographic comparison showing the difference in deformation resistance between the inventive steam-table pan of FIG. 1 (the pan on the right) and an old-style standard steam-table pan (the pan on the left), each pan having a depth of approximately 2.5 inches.
Figure 9A:
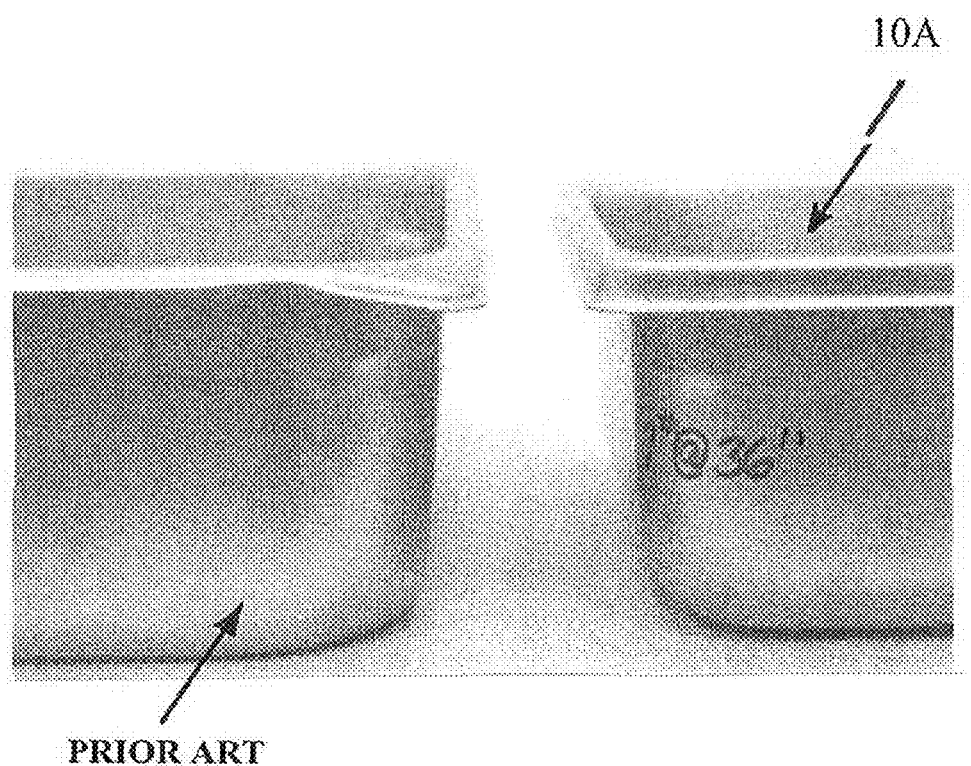
FIG. 9A is a similar side-by-side photographic comparison showing the difference in deformation resistance between the inventive steam-table pan of FIG. 4 (the pan on the right) and an old-style standard steam-table pan (the pan on the left), each pan having a depth of approximately 4 inches.
Figure 10:
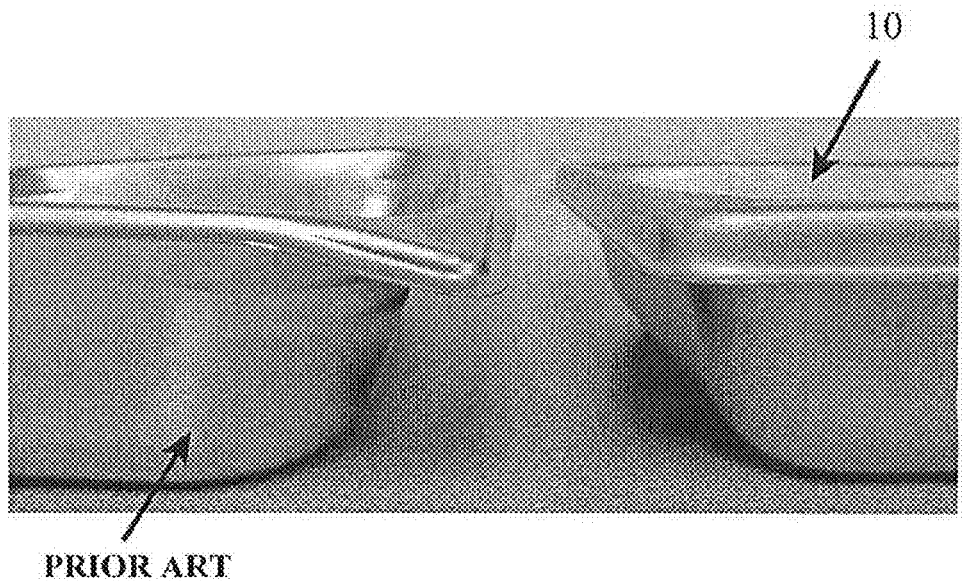
FIG. 10 is another side-by-side photographic comparison, this one showing the difference in deformation resistance between the inventive steam-table pan of FIG. 1 (the pan on the right) and an old-style ramping-type steam-table pan (the pan on the left), each pan having a depth of approximately 2.5 inches.
Figure 10A:
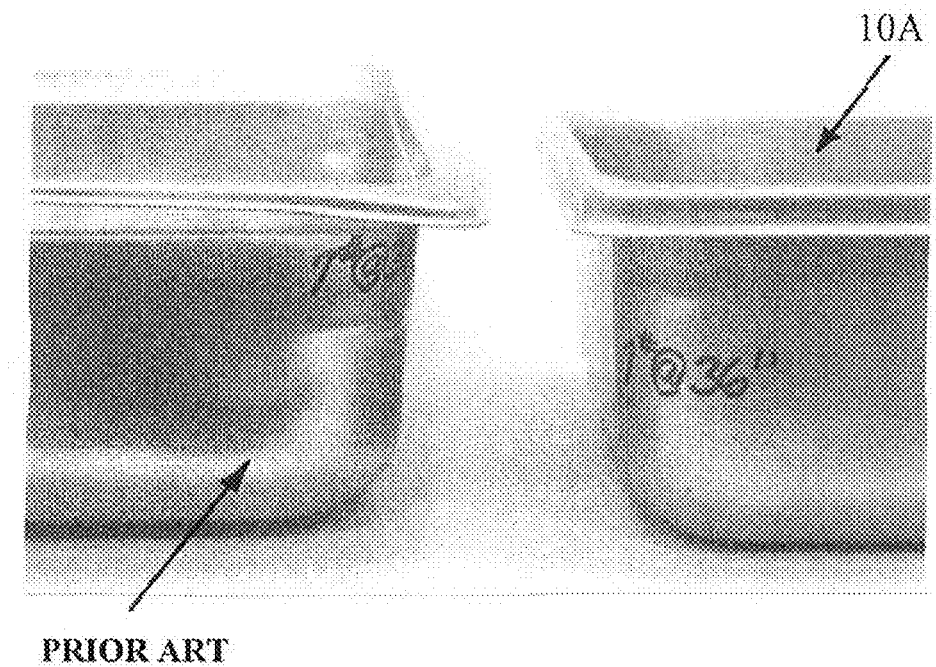
FIG. 10A is a similar side-by-side photographic comparison showing the difference in deformation resistance between the inventive steam-table pan of FIG. 4 (the pan on the right) and an old-style ramping-type steam-table pan (the pan on the left), each pan having a depth of approximately 4 inches.
Figure 11:
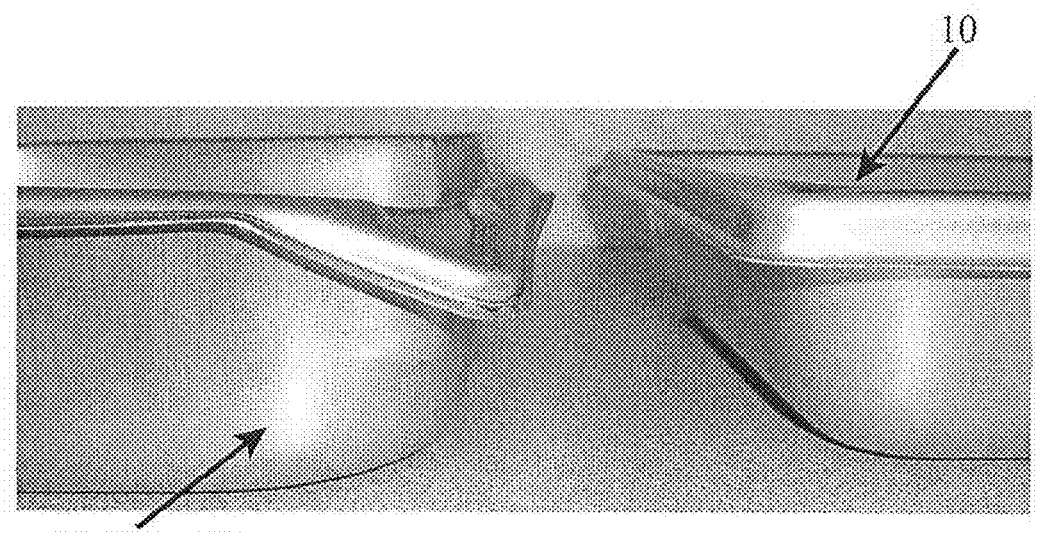
FIG. 11 is yet another side-by-side photographic comparison, this one showing the difference in deformation resistance between the inventive steam-table pan of FIG. 1 (the pan on the right) and an old-style standard steam-table pan with a rim as disclosed in U.S. Pat. No. D333,944 (the pan on the left), each pan having a depth of approximately 2.5 inches.
Figure 11A:
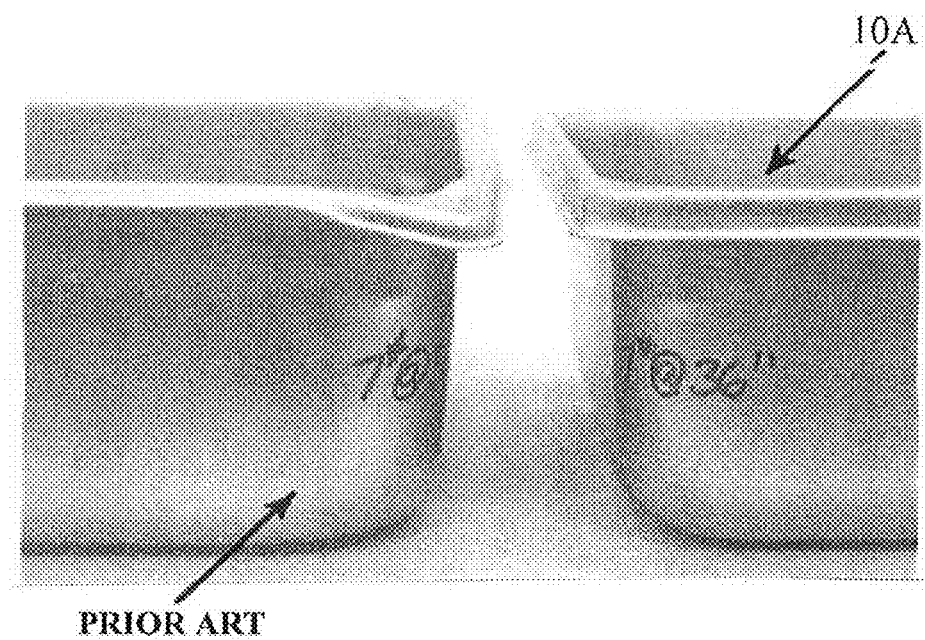
FIG. 11A is a similar side-by-side photographic comparison showing the difference in deformation resistance between the inventive steam-table pan of FIG. 4 (the pan on the right) and an old-style standard steam-table pan with a rim as disclosed in U.S. Pat. No. D333,944 (the pan on the left), each pan having a depth of approximately 4 inches.
Figure 12:
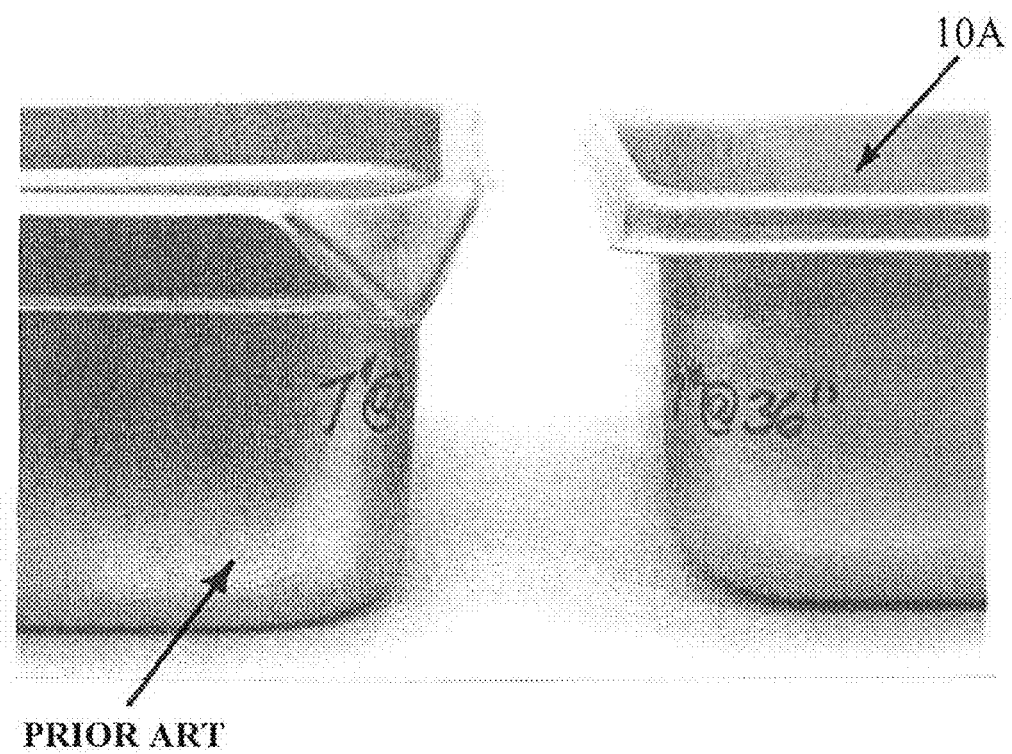
FIG. 12 is still another side-by-side photographic comparison showing the difference in deformation resistance between the inventive steam-table pan of FIG. 4 (the pan on the right) and an old-style standard steam-table pan of the sort having an offset wall shoulder (the pan on the left), each pan having a depth of approximately 4 inches.

The old-style ramping-type steam-table pan 70 of FIG. 7 includes a surrounding wall 71 having a sloping tipper edge portion 72, a lip-portion 73 integral with the tipper edge 72 and protruding outwardly therefrom to overlap the steam-table top 79, and an outwardly sloping downward portion 74 with a vertical dimension V70 of about 0.1875 inch. Horizontal pinch-gripping is not possible with pan 70. Indeed, prior art pan 70 has extensive extra pan-raising features which are unnecessary in steam-table pans in accordance with the present invention.

FIGS. 9-12 illustrate the dramatic increase in deformation resistance of corner areas of pans 10 and 10A. As indicated above, pan 10A is similar in structure to inventive pan 10 but for the fact that pan 10A has a depth of 4 inches (rather than 2.5 inches as pan 10) and includes anti-jam wall-portion 40. The illustrated pans were tested using a 7-pound weight in the drop testings shown in FIGS. 9A, 10A, 11A and 12 and a 9.2-pound weight in the drop testings shown in FIGS. 9, 10 and 11, with both weights being dropped from a 36-inch height directly onto the corner areas of the pans being tested. These figures show the great improvements in deformation resistance provided by this invention. All pans tested were 22-gauge drawn steel pans.

The side-by-side comparisons show greater or lesser amounts of substantial problematic deformation of the corner regions of the various old-style steam-table pans, and little or no visible deformation of the corner regions of the pans of this invention. Accurate measurements of deformation are the basis for quantitatively showing the great improvement in deformation resistance.

While the principles of the invention have been shown and described in connection with specific embodiments, it is to be understood that such embodiments are by way of example and are not limiting.

The invention claimed is:

1. A steam-table pan comprising:
a generally planar base having an upper surface for supporting a food product;
first and second pairs of sidewalls integrally formed with the generally planar base, wherein the base and the sidewalls collectively define a food receiving cavity;
a gripping skirt formed along an upper surface of the first and second pairs of sidewalls, the gripping skirt integrally formed with the sidewalls and generally defining an upper periphery of the food receiving cavity, and wherein the gripping skirt includes a first upper portion, a second upper portion parallel to and spaced from the first upper portion, and a bridge portion interconnecting the first and the second upper portions, and wherein the second upper portion includes a lower end configured to engage a tabletop to support the steam-table pan on the tabletop, wherein the gripping skirt is configured in a manner that allows the steam-table pan to be lifted from the tabletop by a user grasping the first and the second upper portions of the gripping skirt and then applying a lifting force; and
wherein adjacent sidewalls intersect at a corner area, and wherein the corner area is constructed such that the corner area remains substantially free of deformations when the steam-table pan is subjected to a seven pound drop test at thirty-six inches.

2. The steam-table pan of claim 1 wherein the planar base, the sidewalls, and the gripping skirt are formed of stainless steel.

3. The steam-table pan of claim 2 wherein the stainless steel is 22 gauge stainless steel.

4. The steam-table pan of claim 1 wherein the gripping skirt has a vertical dimension of one-half inch.

5. The steam-table pan of claim 1 further comprising a smooth interface conjoining the first upper portion of the gripping skirt with the sidewalls.

6. The steam-table pan of claim 5 further comprising a trapezoidal space defined beneath the bridge and between the first and the second upper portions of the gripping skirt.

7. A steam-table pan comprising:
a base and a plurality of sidewalls integrally formed with the base, and collectively defining a receptacle into which a food product may be placed; and
a lip integrally formed with the plurality of sidewalls, and formed along a top surface of the plurality of sidewalls, the lip having a thumb engaging portion adjacent the receptacle and a gripping finger engaging portion opposite the thumb engaging portion such that the steam-table pan may be lifted from engagement with a steam table without inserting a lifting tool between the steam table and the steam-table pan or applying a lifting force to a lowermost end of the lip, wherein adjacent sidewalls intersect at a corner area, and wherein the corner area does not buckle when the steam-table pan is subjected to a seven pound drop test at thirty-six inches.

8. The steam-table pan of claim 7 wherein the lip has a vertical dimension of 0.5 inches.

9. The steam-table pan of claim 7 comprised of stainless steel.

10. The steam-table pan of claim 9 wherein the stainless steel is 22 gauge stainless steel.

11. The steam-table pan of claim 7 further comprising a jam prevention feature formed along an inner surface of at least one of the sidewalls that is operative to prevent jamming when multiple steam-table pans are stacked in a nested arrangement.

12. The steam-table pan of claim 7 wherein the lip further includes a bridge interconnecting the thumb receiving portion and the finger receiving portion, the bridge having a horizontal dimension.

13. The steam-table pan of claim 12 wherein the horizontal dimension is smaller than the vertical dimension of the finger receiving portion.

14. The steam-table pan of claim 7 wherein the sidewalls are angled slightly off-vertical with respect to the base.

15. The steam-table pan of claim 7 wherein each corner area has an inner surface with a radius of curvature.

\* \* \* \* \*